United States Patent [19]

Cottringer et al.

[11] Patent Number: 4,623,364

[45] Date of Patent: Nov. 18, 1986

[54] ABRASIVE MATERIAL AND METHOD FOR PREPARING THE SAME

[75] Inventors: Thomas E. Cottringer; Ronald H. van de Merwe; Ralph Bauer, all of Niagara Falls, Canada

[73] Assignee: Norton Company, Worcester, Mass.

[21] Appl. No.: 662,869

[22] Filed: Oct. 19, 1984

Related U.S. Application Data

[63] Continuation-in-part of Ser. No. 592,689, Mar. 23, 1984, abandoned, which is a continuation-in-part of Ser. No. 572,106, Jan. 19, 1984, abandoned.

[51] Int. Cl.$^4$ .............................................. C09C 1/68
[52] U.S. Cl. ......................................... 51/309; 51/293
[58] Field of Search ................... 51/293, 309; 423/625

[56] References Cited

U.S. PATENT DOCUMENTS

| | | | |
|---|---|---|---|
| 2,947,056 | 8/1960 | Csordás et al. | 51/309 |
| 2,979,414 | 4/1961 | Rushkewitch et al. | 51/309 |
| 3,079,243 | 2/1963 | Ueltz | 51/298 |
| 3,108,888 | 10/1963 | Bugosh | 106/62 |
| 3,121,623 | 2/1964 | Nesin | 51/309 |
| 3,141,747 | 7/1964 | Marshall | 51/309 |
| 3,216,794 | 11/1965 | Roschuk | 51/309 |
| 3,437,468 | 4/1969 | Seufert | 51/309 |
| 3,615,306 | 10/1971 | Jones, II et al. | 51/309 |
| 3,615,308 | 10/1971 | Amero | 51/309 |
| 3,940,276 | 2/1976 | Wilson | 51/309 |
| 4,217,113 | 8/1980 | Sieh et al. | 51/309 |
| 4,252,544 | 2/1981 | Takahashi | 51/309 |
| 4,314,827 | 2/1982 | Leitheiser et al. | 51/298 |
| 4,325,710 | 4/1982 | Tanaka et al. | 51/309 |
| 4,477,427 | 10/1984 | Matyasi et al. | 423/625 |
| 4,487,756 | 12/1984 | Mizrah et al. | 423/625 |

FOREIGN PATENT DOCUMENTS 2099012 12/1982 United Kingdom.

OTHER PUBLICATIONS

Proceeding of the British Ceramic Society-Jan., 1970, pp. 69-83, by Blakelock et al.

*Primary Examiner*—Lorenzo B. Hayes
*Assistant Examiner*—Willie J. Thompson
*Attorney, Agent, or Firm*—Rufus M. Franklin

[57] ABSTRACT

The hardness and microstructure of aluminous abrasives produced from alumina gels are enhanced by introduction of seed material as by wet vibratory milling of the material with alumina media, or by the direct addition of very fine alpha alumina particles in the amount of 1% or less.

3 Claims, No Drawings

ABRASIVE MATERIAL AND METHOD FOR PREPARING THE SAME

This invention is a continuation-in-part of our co-pending application Ser. No. 06/592,689, filed Mar. 23, 1984, now abandoned which was a continuation-in-part of our application Ser. No. 06/572,106, filed Jan. 19, 1984, now abandoned.

FIELD OF THE INVENTION

The invention relates to the production of aluminous abrasive grits or shaped bodies containing high density poly-crystalline alpha alumina, or such alumina with other additives.

BACKGROUND OF THE INVENTION

Hard and strong abrasive grits, for use in grinding wheels, flexible coated abrasive products ("sandpaper"), or as loose abrasive, are produced commercially from alumina containing raw materials either by fusion in an electric furnace or by the firing of shaped bodies containing finely divided alumina at temperatures well below the fusion points of the material. Such lower temperature process is called sintering. This invention relates to aluminous abrasives made by the sintering process.

The first large-scale commercially produced sintered abrasives were produced by the method taught in U.S. Pat. No. 3,079,243 to Ueltz. This patent teaches the milling of calcined bauxite to produce a fine particle size raw material which is then formed into abrasive grit sized particles and fired at about 1500° C. to form hard, strong, tough, pellets of polycrystalline alumina.

Recently, abrasive materials consisting of grits made up of alumina and magnesia spinel, presumably made according to the teachings of U.S. Pat. No. 4,314,827, and made according to the teaching of published British Application No. 2,099,012A, published 1 December 1982, have been commercially introduced. These materials are produced by the sintering (at about 1400° C.) of dried alumina gel particles. U.S. Pat. No. 3,108,888 to Bugosh also teaches making high density alumina (or alumina containing) products by firing a dried alumina gel made from alpha alumina monohydrate (boehmite) or by hot pressing dried powders made from such gels.

Alumina/magnesia-spinel commercial abrasives made from gels contain alumina in the form of cells from 5 to 15 microns in diameter. The cells, or "sunbursts", are made up of many elongated alumina arms 0.2 to 0.4 micrometers in diameter (but some of which can be as large as 1 micrometer in the form of very roughly spherical "blobs"), the arms in each cell appearing generally to radiate from the center of the cell. All of the arms in a given cell are apparently crystallographically identically oriented. Such orientation is shown by the fact all the area of a given cell extinguishes simultaneously upon sample rotation when viewed between crossed polarizers by transmitted light microscopy.

While the commercial abrasives made from sintered gels containing alumina and magnesia are high quality abrasives, it has not been possible to produce high purity alumina grits by the gel route. This is shown by the relative softness and lack of abrasive utility for the "control" example 13 in U.S. Pat. No. 4,314,827 which was made from an alumina gel without metal oxide or metal salt additions.

The present invention is an improvement in the art of making strong abrasive bodies whereby useful abrasive products can be made from alumina gel with or without the addition of zirconia or spinel formers such as magnesia.

DISCLOSURE OF THE INVENTION

The invention resides in the discovery that control of the microstructure of the fired product, such that the cellular structure of the alumina in the prior art abrasives is avoided, results in improved product performance. The resulting product, instead of cell areas of 5 to 10 micrometers in diameter, contains alpha alumina particles (crystallites) of submicron size (0.2 to 0.4 micrometers).

In the case of the higher (e.g. in some cases at 5%) MgO additions these alumina particles are surrounded by a matrix of spinel.

Conditioning of the gel to achieve the described effect can be achieved by vibratory milling of the mix in the sol or diluted gel form while employing alumina bodies as the grinding medium in the mill. It is believed that the main effect of the milling is to introduce material from the alumina grinding media into the alumina gel. Also impurities such as zinc and iron are introduced from the piping and associated equipment. Milling with zirconia bodies, for example, is ineffective to produce the desired essentially non-cellular structure.

The first effective and reproducable method found by us was to generate such material in the gel by vibratory milling of the gel with alumina bodies. A suitable vibratory mill is shown in U.S. Pat. No. 3,100,088. Typically the media may be $\frac{1}{2}$ inch in diameter and $\frac{1}{2}$ to $\frac{3}{4}$ inches long. The tub which contains the media and the mix is vibrated in the horizontal plane by an off-balance weight connected to the shaft of a motor mounted coaxially with the tub which is mounted on springs. The off-balance weight is mounted adjacent the plane of the bottom of the tub and a second weight is mounted below it. The motor typically rotates at 1200 rpm. The combined oscillation subjects the contents to a milling action by the grinding media. The interior surface of the mill is preferably lined, as with rubber, to prevent contamination by erosion of the metal walls.

Various additives such as taught in U.S. Pat. No. 4,314,827 and British Application No. 2,099,012A can be added to the alumina before or after gelling. The most useful additive presently known is any compatible precursor of MgO, whereby the final product contains preferably around 5% MgO. The MgO is present, however, in the product as spinel (magnesium aluminate: $MgAl_2O_4$) but calculated as MgO in the analysis. Obviously lesser amounts of MgO may be included since the alumina with no addition is an excellent abrasive in its own right when produced according to the present invention. The milled gel of the present invention may serve as a matrix for various added materials or abrasive particles.

The milled mix may be simply poured or placed into containers to dry and then broken up into appropriate sized pieces by crushing, with undersized material recycled to the beginning of the process. Alternatively, the material may be formed or molded into shaped particles as by extrusion. In the case of extrusion, the rods formed would later be cut or broken into appropriately sized pieces. The minimum useful firing temperature is significantly below 1200° C., usually considered the transformation point to convert to alpha alumina. The upper limit is not critical so long as the fusion temperature is not reached. Too long a firing or too high a temperature can cause excessive crystal growth. Higher temperatures increase the cost of the process also, so the preferred firing range is 1200° to 1500° C.

EXAMPLE I

In a large polymeric plastic mixing vessel 30 pounds (13.6 Kg) of Condea SB Pural Alumina (supplied by Condea) and 30 Imperial gallons (136 liters) of water were mixed. This material was then gelled by adding 4.1 liters of 14 weight % $HNO_3$. Magnesium nitrate hydrate (7.5 pounds, or 3.4 kg) dissolved in 3 gallons (13.7 liters) of water was then added to the alumina gel to give 5% by weight of MgO in the final product. It was mixed for 15 minutes and transferred to a Model M451 Sweco mill and milled for 1 hour with 1700 pounds of alumina media. The mix was recirculated through the mill for the one hour milling time at a rate of about four gallons per minute. After milling it was pumped into aluminum trays to a thickness of about 3 inches (7.6 cm) for drying on electric strip dryers.

The alumina media composition was about 90% alpha alumina with silica as the main impurity.

A series of batches according to the above formulation were made up and combined for crushing and firing.

The dried gel was then roll crushed and screened to a through 14 mesh sizing before firing, to yield the desired final grit sizes. It was then prefired at 400° C. for 16 hours and fired at 1400° C. for 30 minutes in a rotary kiln.

After firing all of the products had a hardness of 19 GPa (Vickers indenter, 500 g load) and a very fine microstructure in which there was no cellular microstructure and, almost all of the alpha alumina was in the form of generally equiaxed particles (crystallites), 0.2 to 0.4 microns in diameter, except for rare square blocky shapes about 5 microns in diameter. The blocky shapes may have indicated contamination. The product, upon examination by the scanning electron microscope, was seen to be comprised of a spinel matrix and a discontinuous phase of alpha alumina.

In some specific coated abrasive grinding applications the material was superior to fused alumina-zirconia and superior to commercially available sintered gel type abrasive of the alumina-spinel composition.

EXAMPLE II

Pural microcrystalline boehmite alumina, 22.7 kilograms, was mixed with 225 liters of water and 13.5 liters of 14% $HNO_3$ for 10 to 15 minutes.

One half of the gel mixture was milled for 2 hours in the Sweco mill containing ½×½ inch ceramic bonded alumina, 88 $Al_2O_3$ (the main impurities being MgO 1.74%, $SiO_2$ 8.9%, $Fe_2O_3$ 0.18%, $TiO_2$ 0.2%, CaO 0.8%, $Na_2O$ 0.34%), available from Coors Porcelain Co., and dried. This was the same media as used in Example I. The other half was simply dried without milling. The dried gels were crushed to size, prefired at 450° C. for 16 hours and fired at 1400° C. for 1 hour.

The milled material had a hardness of 19.1 GPa, the unmilled material had a hardness of 11.0 GPa.

Material from each batch was screened to produce 50 grit abrasive grains which were then used to produce vulcanized fiber backed coated abrasive discs. The milled material outperformed commercial alumina zirconia abrasive by better than 10% in grinding 1020 steel (the test showed a 14% higher metal removal).

The unmilled product was inferior to fused abrasive in all grinding tests, which was to be expected in view of its low hardness.

EXAMPLE III

In an example similar to that of the milled product of Example 1, the gel was milled for 0.2 hours. The product, fired at 1400° C. for one hour, was mainly of the fine random 0.2 to 0.3 mm crystal structure, but showed some cellular appearance.

EXAMPLES IV TO IX

Further examples were performed in a study of the effect of firing time at 1400° C. All samples were made by the general procedure of Example I. Condea microcrystalline boehmite alumina was employed, milling was for two hours, but after drying, the gels were prefired at 750° C. for 30 minutes. As the firing time was increased, there began to appear in the product a coarse lath shaped crystallization of alumina, randomly dispersed among the fine 0.2 to 0.4 micrometer alumina particles.

The results are tabulated as follows:

| Firing Time (minutes) | Particle Size (Micrometers) | | Ratio % Coarse/% Fine |
| --- | --- | --- | --- |
| | Coarse | Fine | |
| 1 | None | 0.2–0.3 | 0 |
| 3 | 1.0–2.0 | 0.2–0.3 | 5 |
| 5 | 2–5 | 0.2–0.3 | 20 |
| 10 | 4–8 | 0.2–0.3 | 50 |
| 30 | Up to 8 | 0.2–0.3 | 80 |
| 60 | Up to 8 | 0.2–0.3 | 95 |

Since the presence of the coarse fraction is believed to be less desireable, the firing time at 1400° C. should not be more than 5 minutes for the preferred product when the material is prefired at 750° C. for 30 minutes.

In all cases, no cellular structure was observed. The microstructures consisted of the non-faceted submicron particles and the faceted lath-like coarse crystals, except in the case of the 1 minute firing where no laths were found.

By "non-faceted" we mean no regular faceting of the crystallites was observed in a fractured surface at 5,000× magnification by the scanning electron microscope. The particles of alpha alumina were, instead, rather formless, but equiaxed, with generally curved outlines, and very few apparent straight outlines. At 20,000× magnification faceted structure begins to be clearly apparent.

The abrasive grits of this invention have a hardness measured by the Vickers indenter with a 500 gram load of at least 16 GPa (90% density) for alumina without additions and at least 14 GPa for the grits which are modified by the presence of 2% or more of spinel formers or are modified by other additives. While pure dense alpha alumina has a hardness of about 20–21 GPa, some porosity may be desireable for certain applications which would lower the hardness. When the alumina has a hardness of 13 GPa or less, it is too porous for the purposes of this invention. Preferred are hardnesses of 18 GPa or higher as measured by the Vickers indenter at a 500 g load.

EXAMPLE X

A series of abrasives of varying magnesia content were made.

The general procedures of Example I were employed, including the milling (but for 2 hours) with alumina media. In all cases the gels, after drying at 200° C. for about 30 hours, were crushed and screened and then calcined at 450° C. for 16 hours. The resulting grit sized particles were fired in a rotary kiln at 1400° C. The heat-up time to 1400° C. was about 15 minutes, and the time at 1400° C. was about 15 minutes.

Various amounts of magnesium nitrate were added prior to the gelling. In one run no magnesium nitrate was added. The MgO content and hardness of the abrasives were as follows:

| Run No. | MgO Content % by Wgt. | Hardnes (Vickers 500 g load) |
| --- | --- | --- |
| 9498 | 0.14 | 19.9 |
| 9499 | 2.50 | 19 |
| 9500 | 7.95 | 19 |
| 9502 | 12.71 | 19 |

In a series of tests of vitrified (glass bonded) grinding wheels employing 54 grit (a combination of 46 grit and 60 grit sizes) sized abrasive wheels made with the above grits were compared with the highest quality known fused alumina abrasive (sulfide process abrasive).

The tests were carried out by grinding slots in tool steel (D3) at various controlled in feeds. In dry grinding, at 0.5 mils (0.0005 inches) downfeed, the abrasive containing no added MgO (0.14% MgO) had a grinding ratio 16.18 times the grinding ratio of the fused abrasive (G ratio is the volumetric ratio of material removed to wheel wear). All of the MgO additions resulted in superior performance over the fused abrasive in the dry grinding tests. In the wet grinding tests the experimental abrasives with MgO added were poorer than or equal to the fused abrasive. At 2 mils the no-magnesia-addition abrasive was superior to the fused.

In coated abrasive tests employing 50 grit size abrasive (CAMI standard) an abrasive made according to Example X, and containing 0.6% MgO, incorporated into flexible abrasive discs performed better (136%) than co-fused alumina zirconia abrasive on 1020 steel and almost equivalent to fused alumina-zirconia on stainless steel. The abrasives containing 2.5% MgO and 7.59% MgO were also superior on 1020 steel. The higher MgO addition was less effective on stainless.

The 0.14% MgO abrasive contained, in addition to the alumina: 0.25% $SiO_2$, 0.18% $Fe_2O_3$, 0.28% $TiO_2$, 0.05% CaO, and 0.04% $Na_2O$, presumably mainly introduced in the milling operation. Similar levels of these impurities were present in the other abrasives.

While applicants do not wish to be bound by any particular theory of the invention, it is believed that the introduction from the alumina media of particulate matter may effect seeding of the crystallization of alpha alumina during the firing. Additionally, the other impurities introduced in the milling step may inhibit crystal growth of the final product by their presence at grain boundaries between the alpha alumina particles.

As evidence of the fact that it is the debris from the milling media which is effective to condition the gel so that it produces the desired high density, finely crystalline, non-cellular alpha alumina upon firing at about 1400° C., additions of milled water were made to alumina monohydrate together with acid, without milling of the gel.

Water, nitric acid, and microcrystalline boehmite were mixed, as in Example II, except that 6 batches were made, with varying additions of water containing the debris worn from alumina grinding media, when milled for several hours with water (no other addition to the water), as follows:

"Milled water" additions to alumina monohydrate (Condea):

| Trial | Wt. Ratio of milling debris to alumina monohydrate | Wt. % Debris in fired product* | Hardness GPa |
| --- | --- | --- | --- |
| 1. | 0.0074 | 1.07 | 20+ |
| 2. | 0.0037 | 0.53 | 20 |
| 3. | 0.0019 | 0.27 | 19+ |
| 4. | 0.00075 | 0.11 | 17 |
| 5. | 0.00038 | 0.05 | 15 |
| 6. | 0 | 0 | 12.5 |

*Note:
Assuming an average loss of weight in firing of 30%.

The hardness was determined on the fired product, fired at 1400° C.±20° C., for about 10 minutes. The furnace was electrically fired, the atmosphere was air.

Examination of the milled debris showed it to be mostly alpha alumina with a surface area of about 39 square meters/gram.

High purity alumina produced by recovery of the fine suspended alumina particles left in suspension when very fine alumina powders are permitted to settle after being mixed with water is also effective, when used in an amount of at least about 0.1% of the fired gel solids.

Tests with commercial fine alpha alumina powders, and tests with fine alumina generated by milling very high purity fused alumina, using such alumina itself as a milling medium, were very effective in producing the dense finely crystalline product of the invention.

Differential thermal analysis has shown that, when the alpha alumina seed particles are present the transition of the gel alumina from presumably the gamma form to the alpha form takes place at about 1090° C., while, in the absence of such seed material the transition takes place at about 1190° C. Thus, the theoretical minimum firing temperature of the products of the present invention can be below the usual reported transformation temperature.

This invention, for the first time, permits the manufacture by low temperature sintering of high purity alpha alumina bodies having a submicron particle size and a density of greater than 95%, resulting in a hardness greater than 18 GPa. Products other than abrasive, such as coatings, thin films, fibers, rods, or small shaped parts, can be made by the process of the present invention.

Grain growth inhibitors such as $SiO_2$, $Cr_2O_3$, MgO, and $ZrO_2$, have been added to the conditioned gel. In the experiments in which MgO was added there was reaction with the alpha alumina and spinel was formed and was observed as surrounding the remaining unreacted alpha alumina. It was assumed that with the other additives compound formation with the alpha alumina was minimal and they remained in the crystal boundaries. The experiments which have been run clearly show that the crystal growth by diffusion and recrystallization was suppressed by the additives. This has value in allowing more flexibility in the time-temperature relationships for the sintered products. The use of the growth inhibitors are well known in ceramic technology and are not a necessary part of the invention but are very useful to maintain the desired microstructure over a broad range of sintering time-temperature and where the high purity of alpha alumina is not a requirement.

What is claimed is:

1. A method of making ceramic bodies containing alpha alumina having a hardness of greater than 16 GPa, a density greater than 90%, and an alpha alumina particle size below one micron comprising providing a dispersion of submicron hydrated alumina particles, said dispersion including an effective amount of submicron alpha alumina crystals, whereby upon drying and firing said hydrated alumina particles are converted to alpha alumina at a temperature below 1100° C., and firing said body to below 1500° C.

2. A method of making an aluminous abrasive body comprising providing a dispersion of non-alpha alumina particles of submicron size, said dispersion including submicron alpha alumina seed particles, drying said dispersion and firing said dispersion whereby the non-alpha alumina particles are converted to alpha alumina particles of a submicron size and whereby said body has a density of at least 90% of theoretical and a hardness of at least 16 GPa.

3. A method of producing a polycrystalline alumina body by providing fine alumina particles in a form having a theoretical density less than that of alpha alumina, mixing submicron alpha alumina seed material with said fine alumina particles, and firing to a temperature of at least 1090° C. whereby the fine alumina particles are converted to alpha alumina crystals no coarser than 0.4 microns.

* * * * *

UNITED STATES PATENT AND TRADEMARK OFFICE
CERTIFICATE OF CORRECTION

PATENT NO. : 4,623,364

DATED : November 18, 1986

INVENTOR(S) : Thomas E. Cottringer, Ronald H. van de Merwe and Ralph Bauer

It is certified that error appears in the above-identified patent and that said Letters Patent is hereby corrected as shown below:

Column 4, line 29, before "Ratio" insert -- % --;

Column 4, line 30, before "Coarse" cancel "%";

Column 4, line 30, before "Fine" cancel "%" and insert therefor -- Coarse and --.

Signed and Sealed this

Eleventh Day of June, 1991

*Attest:*

HARRY F. MANBECK, JR.

*Attesting Officer*      *Commissioner of Patents and Trademarks*